Clippinger & Pratt
Bed Bottom.
No. 99,636. Patented Feb. 8, 1870.
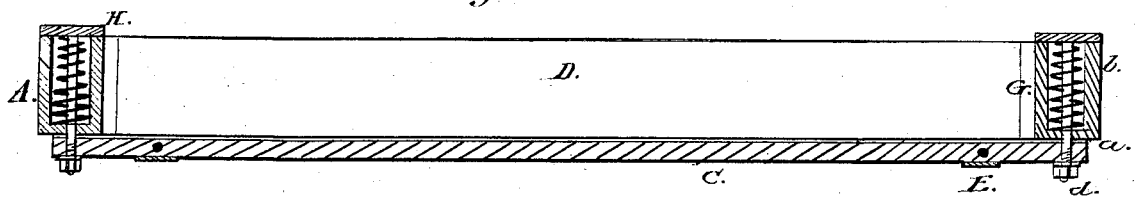
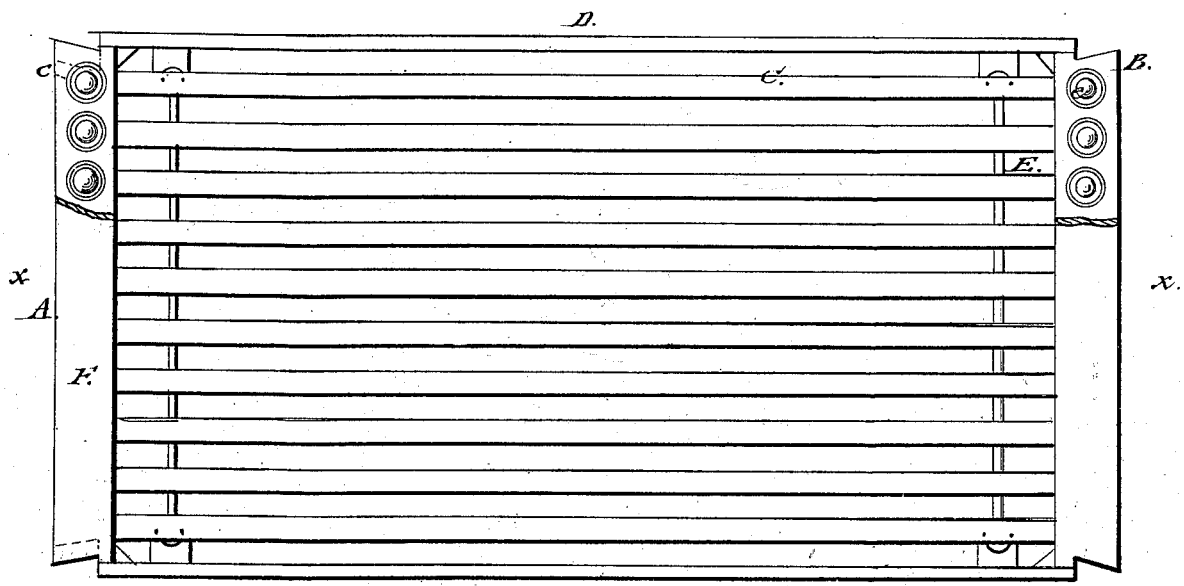
Witnesses:
L. Hailer
P. T. Dodge
Inventor:
I. A. Clippinger
per Dodge & Munn.
attorneys

United States Patent Office.

I. A. CLIPPINGER AND SAMUEL S. PRATT, OF NEWTON, IOWA.

Letters Patent No. 99,636, dated February 8, 1870; antedated January 28, 1870.

IMPROVED BED-BOTTOM.

The Schedule referred to in these Letters Patent and making part of the same.

*To all whom it may concern:*

Be it known that we, I. A. CLIPPINGER and SAMUEL S. PRATT, of Newton, in the county of Jasper, and State of Iowa, have invented certain new and useful Improvements in Spring-Bed Bottoms; and we do hereby declare that the following is a full, clear, and exact description thereof, reference being had to the accompanying drawings, making part of this specification, and to the letters of reference marked thereon, like letters indicating like parts, wherever they occur.

To enable others skilled in the art to construct and use our invention, we will proceed to describe it.

Our invention relates to spring-bed bottoms, and consists in constructing the frame of a bed-bottom, with its ends formed in the shape of a dovetail, to fit easily into corresponding grooves or mortices in the inner corners of a bedstead-frame, and in such a manner that it may be inserted and removed at pleasure, and when inserted, will not only lock itself to the bedstead-frame, but will aid in locking the parts of the bedstead-frame together; and, also, in combining with a bed-bottom frame, thus constructed, a series of slats, suspended from spiral springs, as hereinafter described.

In the drawings—

Figure 1 is a longitudinal vertical section on the line *x-x* of fig. 2; and

Figure 2 is a top plan view, with a portion broken away.

We construct the frame A of our bed-bottom with two side and two end pieces. The latter are made square on all sides, except their ends, which are cut in the form of a dovetail, as clearly shown in fig. 2.

The inner sides of the posts of the bedstead-frame, not shown, are provided with dovetailed mortises, so that the bed-bottom can be readily dropped into or removed from its seat, when desired.

The ends of the frame A we provide with a series of holes, B, having shoulders *a*, at their lower ends, and in these holes place spiral springs *b*, which rest upon the shoulders *a*.

In the centre of these spiral springs we insert short rods *c*, provided at their upper ends with a broad head, to prevent them from slipping through the springs, and connect their lower ends to slats G.

Each slat is connected at each end to a bolt, and the whole are connected with each other and to the sides D of the frame with any suitable elastics E.

Over the holes in the ends of the frame A, we place top pieces F, to keep out all dirt or other foreign substances from the holes B.

The operation of our bed-bottom frame is apparent. As the slats C are suspended from the spiral springs by the rods C, and as each is suspended independent of the other, and yet connected together by the elastic cords E, it is evident that the whole will furnish an admirable spring bottom for bed-purposes. Being made separate from the frame of the bedstead, it can be attached or detached, as desired, by means of its dovetailed ends, when the bedstead frame is correspondingly constructed for that purpose, or, as is obvious, it may be placed in any ordinary bedstead-frame, having suitable supports or rests for it.

Having thus described our invention,

What we claim, is—

A bed-bottom frame, A, having its ends formed in the shape of a dovetail, as herein shown and described, in combination with the spiral springs *b*, slats C, and elastics E, when constructed and arranged as set forth, for the purpose of easy attachment to and removal from a bedstead-frame.

I. A. CLIPPINGER.
SAMUEL S. PRATT.

Witnesses:
G. N. CHITTENDEN,
JOHN CLIPPINGER.